Feb. 4, 1947.     R. A. WYATT     2,415,155
INTERNAL-COMBUSTION ENGINE
Filed May 13, 1943     2 Sheets-Sheet 1

INVENTOR
Raymond A. Wyatt.
BY
ATTORNEYS.

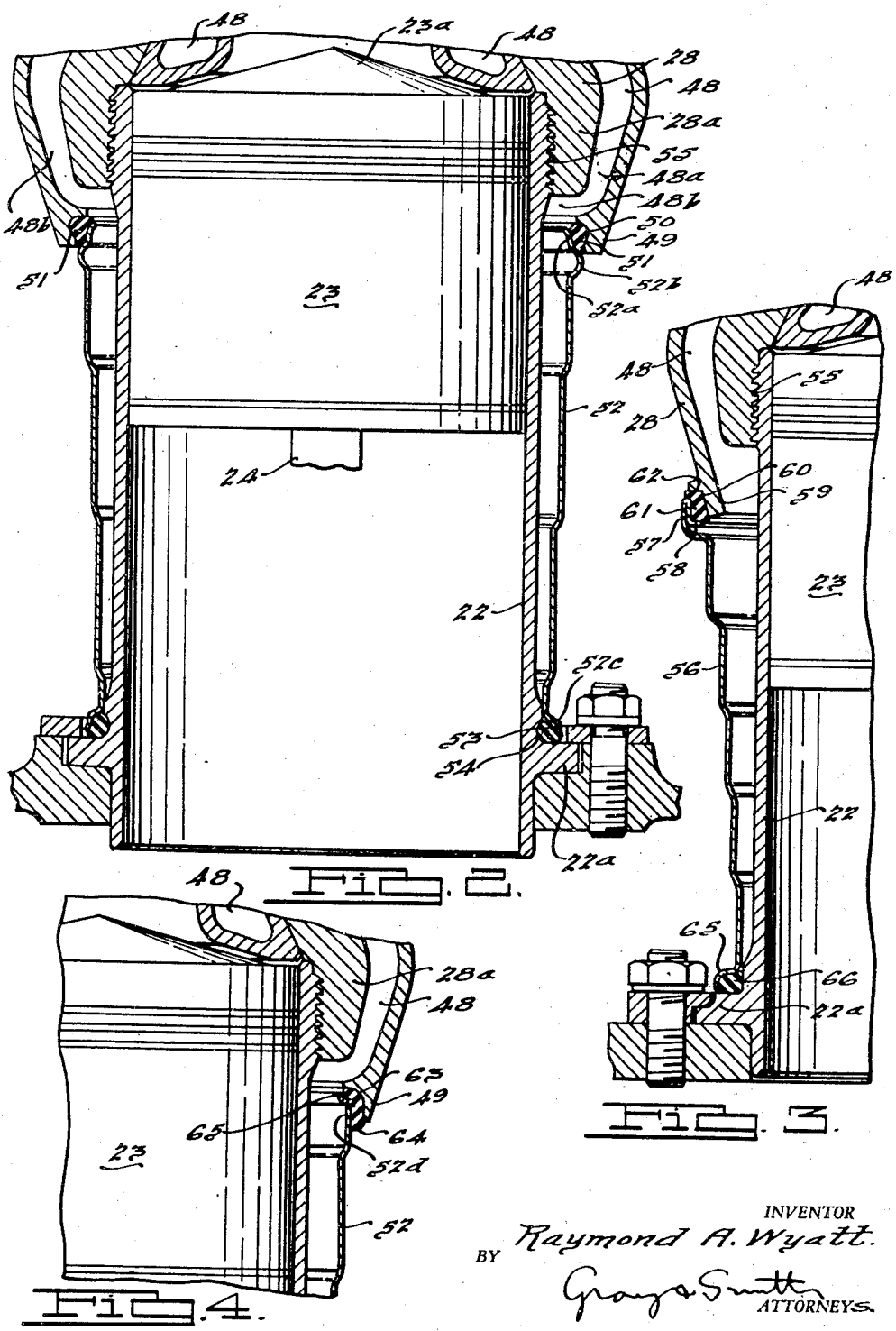

Patented Feb. 4, 1947

2,415,155

UNITED STATES PATENT OFFICE 2,415,155

INTERNAL-COMBUSTION ENGINE

Raymond A. Wyatt, Detroit, Mich., assignor to Briggs Manufacturing Company, Detroit, Mich., a corporation of Michigan Application May 13, 1943, Serial No. 486,825

11 Claims. (Cl. 123—80)

This invention relates to internal combustion engines and particularly to improvements in the cooling system of liquid cooled engines.

The present invention is especially, although not exclusively, applicable to engines of the class having rotatable valves, preferably but not necessarily rotating continuously in one direction, for controlling the intake and firing of the fuel charge and for exhausting the products of combustion. In the illustrated embodiment of the invention, exemplifying one desirable application of the invention, a rotatable valve of the frusto-conical type is mounted in the cylinder head and is formed with substantially all or at least the major portion of the combustion chamber when the piston is in its position of maximum compression. The valve or rotor is formed with an opening or port in the side of the valve adapted to register with intake and exhaust passages and an ignition device during operation, there being an opening or port at the inner end of bottom of the rotor communicating at all times with the cylinder. Since the present invention, deals especially with the cooling of the engine, the construction and design of the foregoing parts of the engine may be considerably varied.

In the construction and operation of engines of the foregoing type considerable difficulty has been encountered in controlling the temperatures of the cylinder, cylinder head and valve so as to obtain maximum power output, especially during sustained high speed performance. A further problem has been in connection with the production of a satisfactory liquid cooled engine, particularly of the above type, in which adequate dissipation of heat is obtained especially at localities tending to become overheated, while at the same time providing an engine which may be manufactured relatively cheaply and constructed for easily assembling and overhauling.

Accordingly, an object of the present invention is to provide a liquid cooled engine of improved construction adapted to overcome difficulties heretofore encountered and which may be operated efficiently while attaining relative high performance characteristics.

A further object of the invention is to provide an engine having a rotatable valve forming a substantial portion of the combustion chamber and in which the engine is liquid cooled in an efficient and improved manner.

Another object of the invention is to provide an engine of the foregoing class having means for liquid cooling the rotatable valve together with associated means for cooling the cylinder.

Still a further object of the invention is to provide an engine having a cooling jacket in the cylinder head substantially surrounding the valve and combustion chamber and a separately formed sheet metal cooling jacket surrounding the cylinder providing a liquid cooling chamber communicating with the cooling chamber in the cylinder head and mounted in improved manner.

Another object of the invention is to provide a liquid cooled engine having a separately formed jacket, preferably of sheet metal, surrounding the cylinder, mounted with respect to the cylinder and cylinder head and sealed in improved manner.

Other objects of this invention will appear in the following description and appended claims, reference being had to the accompanying drawings forming a part of this specification wherein like reference characters designate corresponding parts in the several views.

Fig. 2 is an enlarged fragmentary sectional elevation illustrating the cylinder and a portion of the cylinder head construction.

Fig. 3 is a view in part similar to Fig. 2 illustrating a further embodiment.

Fig. 4 is a fragmentary view, in part similar to Fig. 2, illustrating a further embodiment.

Figure 1:
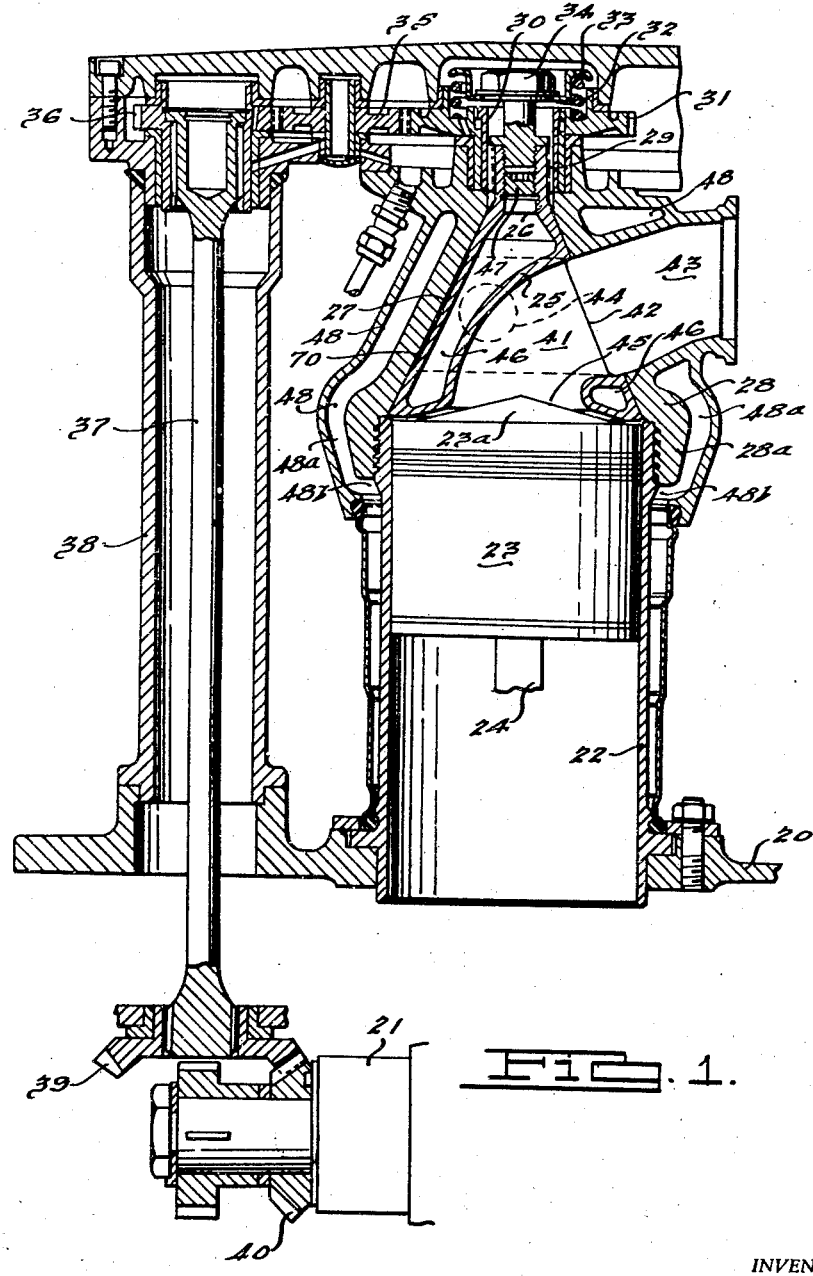
Fig. 1 is a fragmentary sectional elevation illustrating a portion of a multi-cylinder engine embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings I have illustrated, by way of example, one embodiment of the invention as applied to an internal combustion engine of the spark-ignition type designed particularly for the power plant of an aircraft. The invention may obviously be utilized in connection with engines for other purposes. For most uses the engine is of the multi-cylinder type. However, for the purposes of simplicity a single cylinder unit of the engine is illustrated in the present embodiment, it being understood that the remaining cylinders of the engine are identical to the structure herein shown and described.

Referring to Fig. 1, the present engine comprises a suitable crankcase 20 within which is mounted a crankshaft 21 supported in bearings according to conventional practice. A cylinder 22 is secured rigidly to the crankcase and has its lower or inner end projecting thereinto. Mounted to reciprocate within the cylinder is a piston 23 adapted to be connected in the usual manner by a connecting rod 24 to the crankshaft 21.

In the present engine the combustion chamber of the cylinder is formed principally within a rotor or rotary valve member 25, this member comprising a frusto-conical body arranged immediately above the piston when at the top of its stroke. The valve 25 is provided at its outer end with a cylindrical stem 26. The rotor 25 fits within a substantially correspondingly shaped frusto-conical cavity 27 in an upper cylinder head member 28.

The rotor 25 is driven through the medium of the stem 26 which is positively connected to a driving gear in such manner as to permit slight relative axial and radial movement between the driving gear and the rotor or valve 25. Accordingly, the stem 26 has a longitudinal splined connection 29 with a sleeve 30 which in turn has a longitudinal splined or toothed connection at its upper end with a driving gear 31, the gear having a depending cylindrical hub or sleeve interposed between the sleeve 30 and a suitable bearing or bushing as illustrated in Fig. 1, this construction being more fully illustrated in copending application in the names of Waldo G. Gerpandt and Alfred E. Walden, Ser. No. 475,757, filed February 13, 1943, for Engine, as to which reference may be had to such features of construction as do not directly form a part of the present invention. The gear 31 has an annular recess at its outer side adapted to receive and house a compression spring 32. This spring is engaged by a retainer 33 which is clamped to the valve stem 26 by means of a nut 34 provided with a shank threaded into a tapped hole in the stem. The valve is yieldingly held outwardly against the tapered wall 27 of the valve cavity or recess in the head by means of the spring 32. The driving gear 31 is provided with teeth meshing with the teeth of a gear 35 driven by a gear 36 secured to the upper end of a tower shaft 37 extending through a tubular housing 38. Secured to the lower end of the tower shaft is a gear 39 meshing with a gear 40 pinned to the crankshaft 21.

The rotor 25 is formed with a combustion chamber 41 which preferably forms substantially all of the combustion space at the time of firing when the piston 23 is in its position of maximum compression. The piston is preferably formed with a tapered end 23a which is adapted to project a slight distance into the combustion chamber 41, and the bottom of the valve 25 is tapered so as to correspond substantially to the shape of the upper crowned or tapered portion 23a of the piston.

In the particular embodiment herein illustrated the rotor or valve 25 has a single port 42 in its side communicating with the combustion chamber 41 and adapted to register in succession with an exhaust conduit 43, an intake conduit (not shown) and a spark plug at location 44. The valve 25 has a central port or opening 45 at its inner end communicating with the cylinder. In the present embodiment the valve or rotor 25 is driven at one half engine or crankshaft speed. The valve member 25 is formed with a cooling chamber 46 extending entirely around the combustion chamber of the valve member. This cooling chamber is adapted to receive any suitable cooling medium such, for example, as metallic sodium, which is sealed into the chamber by means of a screw plug 47 threaded into the tapped hole of the valve stem 26. The driving mechanism for the valve and the construction above described may be substantially the same as that illustrated in the above mentioned copending application Ser. No. 475,757.

The cylinder head 28 is cored to provide a jacketed cooling chamber 48, the upper portion of which extends in inclined fashion substantially parallel to the tapered wall 27 of the valve cavity. This chamber extends entirely around the valve 25, being intersected only by the intake and exhaust conduits and the spark plug receptacle. The cylinder head 28 has a depending extension or skirt 28a which extends below the valve 25 and valve cavity 27. This extension is also cored to provide an extension 48a of the cooling chamber 48 which extends downwardly and thence inwardly at 48b to the upper outer wall of the cylinder 22. The outer wall of the cooling chamber extension 48a extends below the portion 48b of the valve as shown at 49, this annular terminal portion of the cylinder head extension being spaced from the adjacent wall of the cylinder 22.

The terminal portion 49 of the cylinder head extension or skirt is provided with an annular internal groove or channel 50. Anchored within the groove 50 is an annular resilient rubber ring 51. This ring is preferably formed of synthetic rubber composition, such as neoprene, which is not readily susceptible to decomposition or deterioration on account of exposure to the liquid within the cooling chamber.

Surrounding the cylinder 22 is a sleeve or jacket 52 which is spaced from the cylinder wall and preferably having a stepped formation so that the cooling chamber formed by this jacket or sleeve gradually narrows or becomes shallower toward the bottom of the cylinder. The upper end of the jacket 52 has an inwardly tapered or converging terminal portion 52a, and immediately below this portion the jacket has an annular outwardly bulged or ribbed portion 52b forming a seat for the rubber sealing ring 51, the inner side wall of which engages the tapering portion 52a. The lower edge of the jacket or sleeve 52 is flared outwardly and thence flanged down to form an annular shoulder or abutment adapted to engage the upper face of an annular sealing ring 53 constructed of the same material as the elastic or resilient sealing ring 51. In its unstressed condition each sealing ring 51 and 53 is preferably substantially circular in cross-section. The lower sealing ring 53 is anchored under stress or tension within an annular groove 54 formed at the juncture of the cylinder head wall and a laterally extending ledge 22a extending integrally from the lower end of the cylinder head.

The upper end of the cylinder 22 is telescoped into the lower end of the cylinder head extension 28a and the cylinder is secured therein by means of the threaded connection 55. The jacket or sleeve 52 may be readily held in assembled position with respect to the cylinder 22 and the cylinder head 28, this being accomplished simply by the operation of screwing the cylinder into the lower end of the cylinder head through the medium of the threaded connection 55. As the cylinder head is drawn down onto the cylinder, the rubber ring 51 is tightly clamped and compressed between the wall of the groove 50 and the portions 52a and 52b of the jacket 52. The pressure exerted on the rubber ring as the cylinder head is drawn down on the cylinder causes the rubber to flow laterally, thereby effecting a fluid tight joint between the jacket and the cylinder head extension 49. Similarly, the shoulder portion 52c at the lower end of the jacket is forced tightly against the lower rubber ring 53, causing the rubber to flow and providing a tight seal between the adjacent surfaces of the jacket and cylinder head.

From the foregoing it will be seen that the cooling chamber formed by the jacket or sleeve 52 is in direct communication with the cooling chamber 48 formed in the cylinder head. The jacket 52 is of tubular construction and preferably formed of sheet metal, such as steel or a suitable aluminum alloy. The inlet and outlet connections of the liquid, such as water, to the cooling chamber may be at the upper end of the cylinder head in conventional manner, providing, in the present instance, a thermosyphon circulation. The stepped construction of the jacket or sleeve 52 is important in facilitating heat exchange due to the scrubbing action accomplished on account of this stepped formation.

Referring to the embodiment illustrated in Fig. 3, in this instance the jacket or sleeve 56, which is formed of tubular sheet metal as in the previous embodiment, is provided with an increased number of steps to increase the scrubbing action during circulation of the coolant. The upper end of the jacket has an annular vertical wall 57, the metal at the edge of this wall being folded back and downwardly upon itself and thence flanged inwardly at 58 to provide a seat for the rubber sealing ring. The cylinder head extension projects downwardly and thence inwardly so that the terminal edge 59 of its outer wall lies between the upper edge portion 57 of the jacket and the wall of the cylinder 22. The terminal portion 59 of the cylinder head skirt is formed with an exterior annular groove or channel 60 within which is anchored a sealing ring 61 similar in composition to the sealing rings of the previous embodiment. The ring 61 is adapted to be compressed, when the cylinder head is drawn down onto the cylinder by the threaded connection 55, between a shoulder 62 on the cylinder head and the flange 58 of the jacket 56. The rubber ring 61 is compressed sufficiently to cause the rubber to flow and provide a fluid tight seal at this joint. The lower edge of the jacket 56 is flanged outwardly at 65 to engage a similar sealing ring 66 which is compressed between this flange and the ledge 22a of the cylinder, providing a fluid tight seal at this joint. Other than above described, the construction in the embodiment of Fig. 3 is substantially the same as that previously described in connection with Figs. 1 and 2.

In the embodiment illustrated in Fig. 4, the lower edge of the outer wall of the cylinder head or skirt extension 28a is formed with a groove 63 adapted to receive a sealing ring 64 having a composition similar to that above described. Vulcanized to the rubber ring 64 is a metallic thrust ring 65 adapted to engage the upper end of the jacket or sleeve 52. The groove or channel 63 forms a shoulder engaging the upper edge of the sealing ring which is compressed between this shoulder and the upper edge of the jacket 52, the thrust being taken at this locality by the ring 65. As in the previous embodiments, the rubber ring 64 provides a fluid tight seal at this joint when the cylinder head is screwed down onto the cylinder. The seal at the lower edge of the jacket 52 may be similar to that shown in either Fig. 2 or Fig. 3.

From the foregoing it will be seen that very effective control of the temperature of the valve, cylinder head and cylinder is accomplished by virtue of the present invention. The cooling chamber 46 permits rapid conduction of heat to the adjacent walls of the cylinder head which heat in turn is dissipated by the coolant in the chamber 48. The temperature of the lower portion of the valve, which ordinarily tends to heat up excessively and expand, is maintained sufficiently low to avoid hot spots, destruction of the oil film, scoring and seizure of the valve. The valve and its bearing surfaces may be lubricated in accordance with application Ser. No. 441,474, filed May 2, 1942. The cooling chambers 46 and 48 provide for substantially uniform expansion of the head and the lower portion of the valve, as a result of which there is no appreciable tendency of the valve to expand relatively to the head and bind in this locality due to heat from the combustion chamber. As a consequence, a substantially constant running clearance may be maintained between the valve and cylinder head at the upper and lower tapered bearing surfaces thereof. Intermediate these surfaces in the annular area corresponding to the height of the port 42 the outer wall of the valve may be relieved at 70 in accordance with the above mentioned copending application Ser. No. 475,757 and for the purposes therein set forth.

I claim:

1. An internal combustion engine, comprising a cylinder, a support for the inner end thereof, a cylinder head, a rotatable valve in said head, a tubular jacket surrounding the cylinder and providing a cooling chamber, a resilient sealing means between laterally overlapping portions of the jacket and cylinder head and held in place solely thereby, the outer end of the jacket embracing an adjacent wall portion of the head, and means for relatively adjusting the cylinder and head axially to cause said sealing means to be placed in compression by said portions.

2. An internal combustion engine, comprising a cylinder, a support for the inner end thereof, a cylinder head, a valve in said head, a tubular jacket surrounding the cylinder and providing a cooling chamber, a resilient connection between the jacket and cylinder head providing a seal, the outer end of the jacket extending within an adjacent wall portion of the head, and means for relatively adjusting the cylinder and head to cause integral portions of the jacket and head to compress and hold said resilient connection therebetween.

3. An internal combustion engine, comprising a cylinder, a support for the inner end thereof, a cylinder head, a valve in said head, a tubular jacket surrounding the cylinder and providing a cooling chamber, the outer end portion of the jacket and the inner end portion of the adjacent wall of the head extending one within the other and spaced apart, a resilient sealing ring occupying the space between said portions and held in place entirely by an annular abutment on the cylinder head lying above the outer end of the jacket and an annular abutment on the jacket, and means for adjusting the cylinder within the head to cause said abutments to place said ring under compression.

4. An internal combustion engine, comprising a cylinder, a support for the inner end thereof, a cylinder head, a valve in said head, a tubular jacket surrounding the cylinder and providing a cooling chamber, the outer end portion of the jacket and the inner end portion of the adjacent wall of the head extending one within the other and spaced apart, a resilient sealing ring occupying the space between said portions and held in place entirely by an annular abutment on the cylinder head lying above the outer end of the jacket and an annular abutment on the jacket lying below said inner end portion of the said wall of the head, and means for adjusting the cylinder relatively to the head to cause said abutments to place said ring under compression.

5. An internal combustion engine, comprising a cylinder, a support for the inner end thereof, a cylinder head, a valve in said head, a tubular jacket surrounding the cylinder and providing a cooling chamber, the outer end portion of the jacket and the inner end portion of the adjacent wall of the head extending one within the other and spaced apart, a resilient sealing ring occupying the space between said portions and held in place solely by an annular abutment on the cylinder head and an annular abutment on the jacket formed integrally therewith and lying below said inner end portion of the said wall of the head, and means for relatively adjusting the cylinder and head axially to place said ring under compression between said abutments.

6. An internal combustion engine, comprising a cylinder, a support for the inner end thereof, a cylinder head, a valve in said head, a tubular jacket surrounding the cylinder and providing a cooling chamber, the outer end portion of the jacket extending within the inner end portion of the adjacent wall of the head and spaced therefrom, a resilient sealing ring occupying the space between said portions and held in place solely by an annular abutment on the cylinder head lying above the outer end of the jacket and an annular abutment on the jacket, and means for relatively adjusting the cylinder and head to place said ring under compression between said abutments.

7. An internal combustion engine, comprising a cylinder, a support for the inner end thereof, a cylinder head, a valve in said head, a tubular jacket surrounding the cylinder and providing a cooling chamber, the outer end portion of the jacket extending within the inner end portion of the adjacent wall of the head and spaced therefrom, a resilient sealing ring occupying the space between said portions and held in place solely by an annular abutment on the cylinder head and an annular abutment on the jacket formed integrally therewith and lying below said inner end portion of the said wall of the head, and means for relatively adjusting the cylinder and head to place said ring under compression between said abutments.

8. An internal combustion engine, comprising a cylinder, a support for the inner end thereof, a cylinder head, a valve in said head, a tubular jacket surrounding the cylinder and providing a cooling chamber, the outer end portion of the jacket and the inner end portion of the adjacent wall of the head extending one within the other and spaced apart, a resilient sealing ring occupying the space between said portions and held in place solely by a portion of the jacket and an annular abutment on the cylinder head lying above the outer end of the jacket, and means for adjusting the cylinder axially relatively to the head to place said ring under compression.

9. In an internal combustion engine, a cylinder, a cylinder head, a valve in the head, said cylinder head having a cooling chamber surrounding the valve and extending continuously around the inner end of the valve, a jacket separate from the cylinder head surrounding the cylinder and forming a cooling chamber communicating with the cooling chamber in the head, the outer end of the jacket extending within an adjacent wall portion of the head and spaced therefrom, resilient fluid sealing means occupying said space and held in place solely by a portion of the jacket and an annular abutment on the cylinder head lying above the outer end of the jacket, and a threaded connection between the head and cylinder for relatively moving the same axially of the cylinder to place said sealing means in compression between said portion of the jacket and said annular abutment.

10. In an internal combustion engine, a cylinder, a cylinder head, a valve in the head, said cylinder head having a cooling chamber surrounding the valve and extending continuously around the inner end of the valve, a jacket separate from the cylinder head surrounding the cylinder and forming a cooling chamber communicating with the cooling chamber in the head, the outer end of the jacket and the adjacent wall of the cylinder head extending one within the other and spaced apart, resilient fluid sealing means occupying said space, resilient fluid sealing means interposed between the inner end of the jacket and a fixed portion of the engine, and a threaded connection between the head and cylinder for relatively moving the same axially of the cylinder to place both of said sealing means in compression, the first named sealing means being compressed between and held in place solely by a portion of the jacket and an annular abutment on the head overlying the outer end of the jacket.

11. In an internal combustion engine, a cylinder, a cylinder head, a valve in the head, said cylinder head having a cooling chamber surrounding the valve and extending continuously around the inner end of the valve, a jacket separate from the cylinder head surrounding the cylinder and forming a cooling chamber communicating with the cooling chamber in the head, the outer end of the jacket and the adjacent wall of the cylinder extending one within the other and spaced apart, resilient fluid sealing means occupying said space, and means for compressing said sealing means between said end of the jacket and a portion of the cylinder head lying above the jacket by compressive action exerted on the jacket side wall in a direction axially of the cylinder, said sealing means being held in place solely by said end of the jacket and cylinder head portion.

RAYMOND A. WYATT.

REFERENCES CITED

The following references are of record in the file of this patent:

UNITED STATES PATENTS

| Number | Name | Date |
|---|---|---|
| 2,305,874 | Insley | Dec. 22, 1942 |
| 887,013 | Packard et al. | May 5, 1908 |
| 968,545 | Dodge | Aug. 30, 1910 |
| 1,292,634 | Opperman | Jan. 28, 1919 |
| 2,125,106 | Gehret | July 26, 1938 |
| 2,072,474 | Helming | Mar. 2, 1937 |
| 2,146,528 | Chilton | Feb. 7, 1939 |
| 1,866,873 | Barbarou | July 12, 1932 |

FOREIGN PATENTS

| Number | Country | Date |
|---|---|---|
| 425,858 | French | June 22, 1911 |
| 358,916 | German | Sept. 16, 1922 |